United States Patent
Al-Haj Ali et al.

(10) Patent No.: US 10,829,610 B2
(45) Date of Patent: Nov. 10, 2020

(54) PROCESS AND APPARATUS FOR IN-LINE BLENDING OF POLYMERS

(71) Applicant: BOREALIS AG, Vienna (AT)

(72) Inventors: Mohammad Al-Haj Ali, Helsinki (FI); Michiel Bergstra, Berchem (BE); Erik Eriksson, Stenungsund (SE); Guhan Mathivanan, Linz (AT); Jukka Räsänen, Porvoo (FI); Henry Sleijster, Echt (NL); Sameer Vijay, Linz (AT); Christof Wurnitsch, Neufelden (AT); Samuli Zitting, Tuusula (FI); Vasileios Kanellopoulos, Linz (AT); Jani Aho, Helsinki (FI)

(73) Assignee: BOREALIS AG, Vienna (AT)

( * ) Notice: Subject to any disclaimer, the term of this patent is extended or adjusted under 35 U.S.C. 154(b) by 211 days.

(21) Appl. No.: 16/065,066

(22) PCT Filed: Dec. 21, 2016

(86) PCT No.: PCT/EP2016/082207
§ 371 (c)(1),
(2) Date: Jun. 21, 2018

(87) PCT Pub. No.: WO2017/108969
PCT Pub. Date: Jun. 29, 2017

(65) Prior Publication Data
US 2018/0371201 A1    Dec. 27, 2018

(30) Foreign Application Priority Data

Dec. 21, 2015  (EP) .................................... 15201460

(51) Int. Cl.
| C08F 10/02 | (2006.01) |
|---|---|
| C08F 210/16 | (2006.01) |
| C08F 2/01 | (2006.01) |
| C08J 11/02 | (2006.01) |
| C08F 2/00 | (2006.01) |
| C08F 6/00 | (2006.01) |
| C08F 2/06 | (2006.01) |
| C08F 6/12 | (2006.01) |
| C08L 23/08 | (2006.01) |
| C08L 23/14 | (2006.01) |

(52) U.S. Cl.
CPC .............. *C08J 11/02* (2013.01); *C08F 2/001* (2013.01); *C08F 2/06* (2013.01); *C08F 6/003* (2013.01); *C08F 6/12* (2013.01); *C08F 210/16* (2013.01); *C08J 2323/08* (2013.01); *C08J 2323/14* (2013.01); *C08L 23/0815* (2013.01); *C08L 23/14* (2013.01); *Y02P 20/582* (2015.11)

(58) Field of Classification Search
CPC ........... C08F 2/01; C08F 10/02; C08F 210/16
See application file for complete search history.

(56) References Cited

U.S. PATENT DOCUMENTS

| 5,001,205 | A | 3/1991 | Hoel | |
|---|---|---|---|---|
| 5,001,244 | A | 3/1991 | Welborn, Jr. | |
| 8,143,352 | B2* | 3/2012 | Kiss | ........................ C08F 10/06 525/191 |
| 8,916,659 | B1 | 12/2014 | Costin et al. | |
| 9,120,886 | B2* | 9/2015 | Hottovy | ................ C08F 210/14 |
| 2009/0163642 | A1 | 6/2009 | Kiss et al. | |
| 2009/0163643 | A1 | 6/2009 | Kiss et al. | |

FOREIGN PATENT DOCUMENTS

| EP | 0280352 A1 | 8/1988 |
|---|---|---|
| EP | 0280353 A1 | 8/1988 |
| EP | 0286148 A1 | 10/1988 |
| EP | 2125902 B1 | 8/2013 |
| WO | 8703604 A1 | 6/1987 |
| WO | 9325590 A1 | 12/1993 |
| WO | 2006083515 A1 | 8/2006 |
| WO | 2008082511 A1 | 7/2008 |
| WO | 2008109094 A1 | 9/2008 |
| WO | 2009035580 A1 | 3/2009 |
| WO | 2009126277 A2 | 10/2009 |
| WO | 2011087728 A2 | 7/2011 |
| WO | 2013137962 A1 | 9/2013 |
| WO | 2015073132 A1 | 5/2015 |

OTHER PUBLICATIONS

International Search Report and Written Opinion issued in PCT/EP2016/082207, dated Apr. 13, 2017.

* cited by examiner

*Primary Examiner* — Rip A Lee
(74) *Attorney, Agent, or Firm* — Insigne LLP

(57) ABSTRACT

The present invention deals with a process for polymerising olefins in a solution and withdrawing a stream of the solution from the polymerisation reactor and passing it to a sequence of heating steps. The heated solution is passed to a separation step, which is conducted at a pressure of no more than 15 bar and in which separation step a liquid phase comprising the polymer and a vapour phase coexist. A vapour stream and a concentrated solution stream comprising the polymer are withdrawn from the separation step. At least a part of the vapour stream is passed to the first polymerisation reactor, to the second polymerisation reactor or to both.

26 Claims, No Drawings

PROCESS AND APPARATUS FOR IN-LINE BLENDING OF POLYMERS

FIELD OF THE INVENTION

The present invention pertains to an in-line blending process for two or more reactors operated in parallel configuration for the production of polymers. Especially, the present invention deals with a process for separating and recovering the components of the reaction mixture.

Problem to be Solved

It is known to produce olefin polymers in solution polymerisation process where the unreacted monomer and comonomer and the solvent are separated from the solution and recycled to the polymerisation process.

WO-A-2013137962 discloses a process for concentrating polymer solutions. The separator operates as a liquid-liquid separator (LCST phase separation) for separating high molecular weight polymers from the solution. The document also recommends flash operation for low molecular weight polymers containing substantial amount of polymer having molecular weight of less than 10000 g/mol.

WO-A-2008109094 discloses a process for recovering volatile components from polymer solution. The liquid-liquid separation process (LCST phase separation) returns the volatile components to the polymerisation reactors optionally via one or more separation towers.

WO-A-2008082511 discloses a process where two or more polymerisation reactors feed one high-pressure separator. The pressure in the high-pressure separator can be up to 25 MPa.

WO 2009/035580 A1, US 2009/163643 A1, US 2009/163642 A1, WO 2006/083515 A1, WO 2009/126277 A2, WO 2011/087728 A2 and U.S. Pat. No. 8,916,659 B1 disclose blending processes in which homogenous liquid polymer mixtures polymerized in solution polymerization are separated in single or multiple liquid-liquid high pressure separators. However, these processes have the disadvantage that the polymer concentration in the polymer-enriched liquid streams is rather low so that additional downstream separators are necessary to obtain the pure polymer. Additionally, due to the high pressures in the separation process of usually at least 5 MPa unwanted polymerization downstream the reactors can occur which necessitates killing of the polymerization catalysts usually with polar substances. Said catalyst killers complicate monomer recovery from the polymer-lean streams.

In spite of the prior art there still remains a need for a process having low investment and operation costs and which allows recycling the unreacted monomer and comonomer together with the solvent to the polymerisation reactors and where the carry-over of the polymer into the recycle stream is avoided.

SUMMARY OF THE INVENTION

In a first aspect the present invention provides a process for producing a polymer composition comprising the steps of:

(A) polymerising, in a first polymerisation reactor in a first solvent,
  first olefin monomer having two or more carbon atoms and
  optionally a first alpha-olefin comonomer containing from 3 to 10 carbon atoms,
  in the presence of a first polymerisation catalyst and optionally a chain transfer agent for producing a first solution comprising a first polymer of first olefin monomer and the optional first alpha-olefin comonomer and the first solvent;

(B) polymerising, in a second polymerisation reactor in a second solvent,
  second olefin monomer having two or more carbon atoms and
  optionally a second alpha-olefin comonomer containing from 3 to 10 carbon atoms
  in the presence of a second polymerisation catalyst and optionally a chain transfer agent for producing a second solution comprising a second copolymer of second olefin monomer and the optional second alpha-olefin comonomer and the second solvent;

(C) withdrawing a first stream of the first solution from the first polymerisation reactor;

(D) withdrawing a second stream of the second solution from the second polymerisation reactor;

(E) combining the second stream of the second solution with the first stream of the first solution to produce a combined stream of the first and second solution;

(F) passing the combined stream of the first and second solution to a first heating step and a second heating step;

(G) passing the combined stream of the first and second solution into a separation step, which separation step is conducted at a pressure of no more than 15 bar and in which separation step a liquid phase comprising the polymer and a vapour phase coexist;

(H) withdrawing a vapour stream and a concentrated solution stream comprising the polymer from the separation step;

(I) passing at least a part of the vapour stream to the first polymerisation reactor, to the second polymerisation reactor or to both.

In a second aspect the present invention provides a process for producing a polymer composition comprising the steps of:

(A') polymerising, in a first polymerisation reactor in a first solvent,
  first olefin monomer having two or more carbon atoms and
  optionally a first alpha-olefin comonomer containing from 3 to 10 carbon atoms,
  in the presence of a first polymerisation catalyst and optionally a chain transfer agent for producing a first solution comprising a first polymer of first olefin monomer and the optional first alpha-olefin comonomer and the first solvent;

(B') polymerising, in a second polymerisation reactor in a second solvent,
  second olefin monomer having two or more carbon atoms and
  optionally a second alpha-olefin comonomer containing from 3 to 10 carbon atoms
  in the presence of a second polymerisation catalyst and optionally a chain transfer agent for producing a second solution comprising a second copolymer of second olefin monomer and the optional second alpha-olefin comonomer and the second solvent;

(C') withdrawing a first stream of the first solution from the first polymerisation reactor and passing it to a first heating step and a second heating step;

(D') withdrawing a second stream of the second solution from the second polymerisation reactor and passing it to a third heating step and a fourth heating step;

(E') combining the heated second stream of the second solution with the heated first stream of the first solution to produce a combined stream of the first and second solution;

(F') passing the combined stream of the first and second solution into a separation step, which separation step is conducted at a pressure of no more than 15 bar and in which separation step a liquid phase comprising the polymer and a vapour phase coexist;

(G') withdrawing a vapour stream and a concentrated solution stream comprising the polymer from the separation step;

(H') passing at least a part of the vapour stream to the first polymerisation reactor, to the second polymerisation reactor or to both.

DETAILED DESCRIPTION

Process Description

The description below refers to two polymerisation reactors connected to one low-pressure separation step. It is possible within the scope of the invention to have also more than two polymerisation reactors in combination with more than one separation step as long as at least two polymerisation reactors feed to one separation step.

Polymerisation

In the polymerization reactors olefin monomers having two or more carbon atoms, one or more catalyst systems, optionally one or more comonomers, optionally one or more chain transfer agents, and optionally one or more diluents or solvents are used for conducting a polymerization. Thus, the polymerization system for each reactor is in its dense fluid state and comprises the olefin monomers, any comonomer present, any diluent or solvent present, any chain transfer agent present, and the polymer product.

The olefin monomer is an alpha-olefin having two or more carbon atoms, preferably from 2 to 10 carbon atoms. Suitable alpha-olefin monomers are selected from the group consisting of ethylene, propylene, 1-butene, 1-hexene, 1-octene, 1-decene, and styrene. More preferably the olefin monomer is selected from the group consisting of ethylene, propylene and 1-butene. Especially preferably the olefin monomer is ethylene or propylene.

One or more comonomers are optionally and preferably present in at least one of the polymerization reactors. The comonomer is selected from the group consisting of alpha-olefins different from the olefin monomer having from 2 to 10 carbon atoms; polyenes, such as non-conjugated alpha-omega-dienes, having from 4 to 10 carbon atoms, cyclic olefins having from 6 to 20 carbon atoms and cyclic polyenes having from 6 to 20 carbon atoms. Preferably, the comonomer is selected from the group of alpha-olefins different from the olefin monomer having from 2 to 10 carbon atoms, such as 1-butene, 1-hexene and 1-octene when the olefin monomer is ethylene; and ethylene, 1-butene and 1-hexene when the olefin monomer is propylene.

Suitably the comonomer is present in both of the polymerisation reactors. Same comonomer may be used in both polymerisation reactors but they may also be different if required, for instance, by product properties. Furthermore, the concentrations of the comonomer or comonomers in the two reactors are suitably different from each other. This allows production of homogeneous blends of two different polymers. However it is also possible to operate the reactors so that the concentrations of the comonomer or comonomers in the two reactors are the same.

The polymerisation catalyst may be any catalyst known in the art which is capable of polymerising the monomer and the optional comonomer. Thus, the polymerisation catalyst may be a Ziegler-Natta catalyst as disclosed in EP-A-280352, EP-A-280353 and EP-A-286148, or it may be a metallocene catalyst as disclosed in WO-A-1993025590, U.S. Pat. No. 5,001,205, WO-A-1987003604 and U.S. Pat. No. 5,001,244, or it may be a combination of these. Also other suitable catalysts, such as late transition metal catalysts, can be used.

A chain transfer agent may be used in one or both of the polymerisation reactors for controlling the molecular weight of the polymer as it is known in the art. A suitable chain transfer agent is, for instance, hydrogen. By maintaining different concentrations of the chain transfer agent in the two reactors it is possible to produce a polymer blend having a broadened molecular weight distribution.

It is self-explaining that the reaction conditions applied within the different reactors may not be the same but different when compared with each other. This allows the production of different polymers which finally are blended together. As the reaction conditions can be adjusted completely independent for the further reactor(s), the options for varying the microstructure of the polymers to be blended are very broad.

The solvent is suitably present in the polymerisation process. The solvent may be any suitable straight-chain or branched alkyl having from 3 to 20 carbon atoms, a cyclic alkyl, optionally having alkyl substituents, having from 5 to 20 carbon atoms, or an aryl, optionally having alkyl substituents, having from 6 to 20 carbon atoms, or a mixture of two or more of the above-listed compounds. The solvent must be inert towards the polymerisation catalyst and the monomers. Further, it should be stable in the polymerisation conditions. It further must be able to dissolve the monomer, the eventual comonomers, the eventual chain transfer agent and the polymer in the polymerisation conditions.

The temperature in the polymerisation reactors is such that the polymer formed in the polymerisation reaction is completely dissolved in the reaction mixture comprising the solvent, the comonomer(s), the chain transfer agent and the polymer. Then, for instance, the first solution is formed in the first polymerisation reactor. The temperature is suitably greater than the melting temperature of the polymer. Thus, when the polymer is a homo- or copolymer of ethylene the temperature is suitably from 120° C. to 240° C., such as from 140° C. to 220° C., most preferably from 150° C. to 200° C., depending on the content of comonomer units in the polymer. When the polymer is a homo- or copolymer of propylene the temperature is suitably from 120° C. to 250° C., such as from 140° C. to 235° C., most preferably from 150° C. to 225° C., depending on the content of comonomer units in the polymer.

The pressure in the polymerisation reactor depends on the temperature, on one hand, and the type and the amount of the comonomer, on the other hand. The pressure is suitably from 50 to 300 bar, preferably from 60 to 250 bar and more preferably from 70 to 200 bar.

The preferred process conditions in the reactors are at a temperature of preferably least 120° C., more preferably at least 140° C. and most preferably at least 150° C. and a pressure of preferably at least at 5.0 MPa, more preferably at least at 6.0 MPa and most preferably at least 7.0 MPa.

The process is suitably operated continuously. Thereby streams of monomer, catalyst, and when present streams of comonomer, chain transfer agent and solvent are passed to the polymerisation reactors. A product stream, such as the first stream of the first solution or the second stream of the second solution, comprising the unreacted monomer, dissolved polymer and eventual unreacted comonomer and chain transfer agent as well as the eventual solvent is withdrawn from each reactor.

A product stream, such as the first stream of the first solution or the second stream of the second solution, is withdrawn from each polymerisation reactor, such as the first polymerisation reactor and the second polymerisation reactor. The streams may be passed into the subsequent process stages, such as to the heating steps or to the separation step, as separate streams or they may be combined at a suitable location. Thus, if the streams are combined upstream of the separation step, they may be combined upstream of the first heating step; or upstream of the second heating step but downstream of the first heating step; or downstream of the second heating step but upstream of the separation step; or they may be passed to the separation step as separate streams. Furthermore, if there are more than two reactors, the streams may be passed to the separator according to any one of the procedures discussed above.

The first stream of the first solution or the second stream of the second solution each preferably contains from 10 to 35% by weight polymer, more preferably from 12 to 30% by weight polymer, most preferably from 15 to 25% by weight polymer, based on the total weight content of the first stream of the first solution or the second stream of the second solution.

First Heating Step

The first stream of the first solution is passed from the first polymerisation reactor to the first heating step. The purpose of the first heating step is to preheat the first stream before it enters the first separation step.

The first heating step is suitably conducted in a heat exchanger. For instance, the first stream of the first solution is distributed in a number of tubes and a heating fluid is passed to contact the tubes thereby heating the solution flowing therein.

The purpose of the first heating step is to recover the heat from the process streams thereby improving the economy of the process.

The heating fluid may be any process fluid which contains recoverable heat. Preferably the vapour stream recovered from the separation step is used as the heating fluid. During the process the heating fluid, e.g. the vapour stream, is cooled. It is preferred to withdraw so much heat form the vapour stream that at least a part of the vapour stream condenses in the first heating step.

Typically the temperature of the solution stream, like the first stream of the first solution, the second stream of the second solution or the combined solution stream, before entering the first heating step is from 120° C. to 240° C., preferably from 140° C. to 220° C., most preferably from 150° C. to 200° C., when the polymer is a homo- or copolymer of ethylene. Typically the temperature of the solution stream, like the first stream of the first solution, the second stream of the second solution or the combined solution stream, before entering the first heating step is from 120° C. to 250° C., preferably from 140° C. to 235° C., most preferably from 150° C. to 225° C., when the polymer is a homo- or copolymer of propylene.

The temperature of the solution stream immediately downstream of the first heating step is from 160° C. to 240° C., preferably from 170° C. to 220° C., most preferably from 180° C. to 200° C., when the polymer is a homo- or copolymer of ethylene. The temperature of the solution stream immediately downstream of the first heating step is from 200° C. to 250° C., preferably from 210° C. to 250° C., most preferably from 220° C. to 250° C., when the polymer is a homo- or copolymer of propylene.

The temperature of the heating medium, like the vapour stream, prior to entering the first heating step is preferably from 120° C. to 240° C.

It is preferred that the pressure of the solution stream, like the first stream of the first solution, the second stream of the second solution, or the combined solution stream, is not substantially affected by the first heating step. The pressure is suitably from 50 to 300 bar, preferably from 60 to 250 bar and more preferably from 70 to 200 bar.

Second Heating Step

The purpose of the second heating step is to heat the solution stream to a required temperature for the separation step. The second heating step is required because the recoverable heat in the heating medium in the first heating step may be insufficient for reaching the desired temperature of the solution stream.

The second heating step may be conducted by using similar principles as the first heating step. However, the temperature of the heating fluid used in the second heating step is suitably controlled to a temperature which allows heating of the solution stream, such as the first stream of the first solution, to the desired temperature. Thereby it is preferred that the stream of the heating fluid used in the second heating step is heated to a desired temperature prior to introducing it into the second heating step.

According to one embodiment of the invention the temperature of the solution stream, i.e., the first stream of the first solution, the second stream of the second solution, or the combined stream comprising the first stream of the first solution and the second stream of the second solution, is measured downstream of the first heating step and the flow rate of the heating fluid used in the second heating step is adjusted based on the difference between the measured temperature and the desired temperature of the solution stream.

The temperature of the solution stream downstream of the second heating step is typically from 200° C. to 300° C., preferably from 200° C. to 260° C. and more preferably from 210° C. to 230° C., when the polymer is a homo- or copolymer of ethylene. The temperature of the solution stream downstream of the second heating step is typically from 200° C. to 300° C., preferably from 210° C. to 270° C. and more preferably from 220° C. to 250° C., when the polymer is a homo- or copolymer of propylene.

It is preferred that the pressure of the solution stream, like the first stream of the first solution the second stream of the second solution, or the combined solution stream, is not substantially affected by the second heating step. The pressure is suitably from 50 to 300 bar, preferably from 60 to 250 bar and more preferably from 70 to 200 bar.

Separation Step

The solution stream is passed to the separation step where the temperature and pressure are adjusted such that a liquid phase and a vapour phase are obtained. The polymer is dissolved in the liquid phase which comprises a part of the eventual solvent and a part of the eventual unreacted comonomer while most part of the unreacted monomer, eventual unreacted chain transfer agent, eventually a part of the unreacted comonomer, and eventually, a part of the solvent form the vapour phase.

The temperature in the separation step is suitably within the range of from 120° C. to 240° C., preferably from 140° C. to 220° C. and more preferably from 150° C. to 200° C., when the polymer is a homo- or copolymer of ethylene. The temperature in the separation step is suitably within the range of from 120° C. to 240° C., preferably from 140° C. to 220° C. and more preferably from 150° C. to 200° C., when the polymer is a homo- or copolymer of propylene.

The pressure in the separation step is from 1 to 15 bar, preferably from 2 to 12 bar and more preferably from 5 to 10 bar.

The conditions in the separation step should be as such that no unwanted polymerization downstream the reactors can occur which would necessitate killing of the polymerization catalysts usually with polar substances. Thus, in a preferred aspect of the present invention no catalyst killing is added to the unreduced reactor effluents stream before or during the separation step.

In another aspect of the present invention, which, however, is not preferred, catalyst killing agent is added to the unreduced reactor effluents stream before or during the separation step. The catalyst killing agent is usually a polar component such as water, alcohols (such as methanol and ethanol), sodium/calcium stearate, CO, and combinations thereof.

As discussed above, the conditions in the separation step need to be such that the vapour phase and the liquid phase are formed. Thereby the recycle of the reactants to the reactors can be maintained as simple as possible.

The separation step may be conducted according to any separation method known in the art where a liquid phase and a vapour phase coexist. It is preferred to conduct the separation step as a flashing step, because of the easiness of operation. As it is well known in the art the liquid feed is passed to a vessel operated at a reduced pressure. Thereby a part of the liquid phase vaporises and can be withdrawn as an overhead stream (or a vapour stream) from the flash. The part remaining in liquid phase is then withdrawn as a bottom stream (or a liquid stream).

The advantage of having a vapour phase and a liquid phase present in the separation step is for the first a simple apparatus and thus low investment cost. In addition, the carry-over of polymer with the vapour stream is minimal.

Suitably the combined solution stream is passed to the separation step via a mixer. Alternatively each of the first stream of the first solution and the second stream of the second solution is passed to the separation step via separate mixers if the streams are passed to the separation step separately. The mixer is suitably a static mixer. Static mixers are well known in the art and the person skilled in the art is capable of selecting a suitable mixer for the process. The use of the mixer enhances the mixing of the first and the second solution, on one hand, and the mass transfer of the volatile components from the liquid phase to the vapour phase, on the other hand by substantially increasing the mass transfer area.

It is preferred that the first stream of the first solution and the second stream of the second solution are combined to a combined solution stream before passing them to the separation step. Such combination is suitably done upstream of the mixer and using any one of the different options for combining streams discussed above.

In a preferred embodiment the separation step is a flashing step as discussed below. The flashing step is suitably conducted in a flash vessel which is a vertical vessel preferably having a generally cylindrical shape. Thereby the flash vessel has a section which has approximately a circular cross-section. Preferably the flash vessel has a cylindrical section which has a shape of a circular cylinder. In addition to the cylindrical section the flash vessel may have additional sections, such as a bottom section, which may be conical, and a top section which may be hemispherical. Alternatively, the flash vessel may also have a generally conical shape.

The temperature in the flash vessel is typically from 120 to 240° C. The temperature should be sufficiently high to keep the viscosity of the solution at a suitable level but less than the temperature where the polymer is degraded. The pressure in the flash vessel is typically from 15 bar to atmospheric, or even less than atmospheric.

The solution stream enters the flash vessel at the top. The solution travels downwards in the flash vessel while the gases which evaporate from the solution travel upwards. According to this preferred embodiment the polymer solution forms a thin film which falls downwards in the flash vessel. This facilitates the removal of hydrocarbons from the polymer solution. The gases are typically withdrawn from the top of the flash vessel while the solution is withdrawn from the bottom.

According to an especially preferred embodiment the first stream of the first solution is sprayed in the flash vessel. The spraying can be done by using one or more suitable nozzles which disperse the solution stream into droplets. Such nozzles are well known in the industry and include air atomising nozzles, flat fan nozzles, hollow cone nozzles and full cone nozzles. Preferably the nozzles break the stream into droplets having the size of not more than about 1 mm.

The nozzle forms a stream of droplets in the flash vessel. The stream of droplets then coagulates within the flash vessel and forms a falling film having a relatively high surface area. This enhances the mass transfer of the volatile components from the solution.

As described above the flash vessel can have a vertical generally cylindrical shape. Then the stream of droplets is directed tangentially with the wall of the flash vessel by a suitable position of the nozzle. Thus, the nozzle is suitably located relatively near to the wall so that its outlet is directed tangentially with the wall. When the stream of the droplets exits the nozzle it moves in the direction of the wall forming a downwards falling film. It is also possible that the flash vessel has a vertical generally conical shape. In such embodiment it is possible to direct the stream of the droplets tangentially with the wall of the flash vessel, as described above. However, it is also possible direct the droplets axially towards the wall of the flash vessel. The nozzle or the nozzles are then arranged eccentrically within the flash vessel. In both arrangements the polymer solution forms a falling film within the flash vessel.

The polymer content in solution stream withdrawn from the first flashing stage is typically from 40 to 90% by weight, preferably from 50 to 80% by weight, and most preferably from 60 to 75% by weight, based on the total weight content of the solution stream. In other words, the product stream withdrawn from the first flashing stage contains from 10 to 60% by weight, preferably from 20 to 50% by weight and most preferably from 25 to 40% by weight of residual hydrocarbons, based on the total weight content of the solution stream.

When viewed from a different angle, the hydrocarbon stream withdrawn from the flash vessel is from 35 to 80% by weight from the total material streams withdrawn from the flash vessel. The hydrocarbon stream typically comprises unreacted monomer and also solvent and unreacted comonomer.

By using the flash as described above it is possible to achieve high separation efficiency. For instance, separation efficiency for hydrocarbons containing 6 carbon atoms is at least 70% and preferably at least 75%. Additionally still, separation efficiency for hydrocarbons containing 8 carbon atoms is at least 55% and preferably at least 60%. The separation efficiency is defined as the mass flow of the component withdrawn in the vapour stream divided by the (theoretical) mass flow rate of the component in the vapour stream in equilibrium conditions.

The preferred process conditions in the low pressure separators are at a pressure of preferably less than 1.5 MPa, more preferably less than 1.2 MPa and most preferably less than 1.0 MPa and at a temperature of preferably less than 240° C., more preferably less than 220° C. and most preferably less than 200° C.

It is possible to add additives, such as antioxidants, process stabilisers, UV-stabilisers, antiblocking agents and acid scavengers to the polymer solution upstream the mixer. Such an arrangement allows dispersing the additives homogeneously within the polymer.

A concentrated solution stream is withdrawn from the liquid phase of the separation step. The concentrated solution stream is suitably passed to subsequent process steps, such as further separation, extrusion and pelletisation steps. As understood by the person skilled in the art, the solution stream is mainly in liquid phase but it may contain a minor amount of vapour, for instance, in the form of bubbles. The amount of vapour in the concentrated solution stream is at most 40% by weight, preferably at most 30% by weight, even more preferably at most 20% by weight, such as at most 10% by weight or at most 5% by weight.

Typically the polymer content in the solution stream entering the separation step is from 10 to 35% by weight, preferably from 12 to 30% by weight and most preferably from 15 to 25% by weight. The polymer content in the concentrated solution stream is typically from 40 to 90% by weight, preferably from 50 to 80% by weight, preferably from 60 to 75% by weight.

The vapour phase stream is returned to the polymerisation reactors. A vapour stream is withdrawn from the vapour phase in the separation step. Preferably heat in the vapour stream is recovered before passing it to the polymerisation reactors. Preferably at least a part of the vapour stream is passed to the first heating step for heating the solution stream. The vapour stream may contain a small amount of liquid, for instance, in the form of droplets. The amount of liquid in the vapour stream withdrawn from the separation step is at most 40% by weight, preferably at most 30% by weight, even more preferably at most 20% by weight, such as at most 10% by volume or at most 5% by weight.

Vapour Stream Recycle

If the first stream of the first solution and the second stream of the second solution are combined upstream of the first heating step then it is preferred that the whole vapour stream is passed to the first heating step for heating the combined solution stream comprising the first stream of the first solution and the second stream of the second solution. On the other hand, if the first stream of the first solution is passed to the first heating step and the second stream of the second solution is separately passed to the third heating step then it is preferred that the vapour stream is divided into a first vapour stream and a second vapour stream. The first vapour stream is then passed to the first heating step for heating the first stream of the first solution and the second vapour stream is passed to the third heating step for heating the second stream of the second solution.

In the first heating step the heat carried by vapour stream or by the first vapour stream and the second vapour stream is transferred to the solution stream in the first heating step or in the first and third heating steps. The first heating step is preferably conducted in a heat exchanger, where the heat is transferred to the solution stream and consequently the vapour stream is cooled in the first heating step. The vapour stream may cool to an extent that a part of it condenses. The discussion above applies also to the first and second vapour streams and the third heating step if the third heating step is present.

The vapour stream is recovered from the first heating step. Alternatively, the first vapour stream is recovered from the first heating step and the second vapour stream is recovered from the third heating step after which the first vapour stream and the second vapour stream are recombined to form the vapour stream.

The vapour stream is then optionally passed to a condensing step. In the condensing step the vapour phase is partly condensed to form a condensed vapour stream and an uncondensed vapour stream. The condensing step is useful when the first polymerisation reactor and the second polymerisation reactor are operated in different conditions, such as at different concentrations of the chain transfer agent, such as hydrogen. Then hydrogen may be separated in the condensing step from the condensed vapour stream. It is also possible, and preferred, that the vapour stream already has been condensed in the first heating step or in the first and third heating steps. Thereby no separate condensing step is needed but the first heating step or the first and the third heating steps serve as condensing steps.

The partially condensed vapour stream may then be divided into a condensed vapour stream and an uncondensed vapour stream. This can be done, for instance, in a vessel. The partially condensed vapour stream is passed to the vessel where the condensed fraction remains as a liquid and the uncondensed fraction remains as a vapour. The condensed vapour stream is then withdrawn from the liquid phase and the uncondensed vapour stream is withdrawn from the vapour phase.

The condensed vapour stream is returned to one or both of the first and the second polymerisation reactors. Preferably the condensed vapour stream is returned into both the first and the second polymerisation reactor.

The uncondensed vapour stream is suitably returned into one of the first and the second polymerisation reactors. Suitably the uncondensed vapour stream is returned into the polymerisation reactor which operates at a greater concentration of light components, such as hydrogen. Alternatively, the uncondensed vapour stream can be sent to further processing, such as recovery or waste disposal.

If there is no condensation step then the vapour stream can be passed directly into one of the first and the second polymerisation reactors or into both the first and the second polymerisation reactor. However, as the vapour stream may contain components whose presence may be detrimental for operating one of the polymerisation reactors it is preferred that the vapour stream is passed into one of the first and the second polymerisation reactors. The vapour stream is then passed to the polymerisation reactor whose operation allows the presence of the light components in a greater concentration.

In the non-preferred embodiment that unwanted polymerisation downstream the reactors has been prevented by addition of catalyst killing agents as described above, said catalyst killing agents have to be removed from the polymer-lean vapour stream e.g. by the use of fixed bed absorbents or by scavenging with an aluminium alkyl.

Downstream Process

The concentrated solution stream is then passed to subsequent process steps. Preferably the subsequent process steps include at least one further concentration step. Such at least one further concentration step can be performed, for instance, in a similar manner as the separation step of the present invention.

Furthermore, the polymer from which the residual hydrocarbons have been removed to the desired extent is extruded and pelletised. Before or during the extrusion step the additives are added to the polymer. The resulting pellets are then dried, stored and shipped to the desired use.

Benefits of the Invention

The present invention provides a simple and economical recycling of monomers and solvent into the polymerisation reactors. Especially the vapour stream can be returned to the polymerisation reactors without distillation steps. This provides substantial reduction in the investment and operation costs.

EXAMPLES

Computer simulations were performed using Aspen 8.8 computer software. In the simulation a solution withdrawn from the reaction stage containing 21.2 wt % of a copolymer of ethylene and 1-octene, 0.9 wt % of unreacted ethylene monomer, and 77.9 wt % of n-hexane solvent together with unreacted 1-octene comonomer in example E1 was separated in a flash separator (vapour-liquid separator). Thereby, the temperature of the solution stream was assumed to be 220° C. before entering the flash separator and the pressure was assumed to be 90 barg before entering the flash separator and 9 barg in the flash separator. In comparative example CE2 was separated in a liquid-liquid separator. Thereby, the temperature of the solution stream was assumed to be 220° C. before entering the liquid-liquid separator and the pressure was assumed to be 30-45 barg in the liquid-liquid separator. Comparison of the process flows are shown in Table 1.

TABLE 1

|  | E1 | CE2 |
| --- | --- | --- |
| Top stream | Vapour | Liquid |
| % of feed stream goes to the top stream | 67.5 wt % | 46 wt % |
| % of polymer in top stream | 0 wt % | 0.1 wt % |
| % of ethylene in top stream | 1.4 wt % | 1.9 wt % |
| of solvent + comonomer in top stream | 98.6 wt % | 98.0 wt % |

TABLE 1-continued

|  | E1 | CE2 |
| --- | --- | --- |
| Bottom stream | Liquid | Liquid |
| % of feed stream goes to the bottom stream | 32.5 wt % | 54 wt % |
| % of polymer in bottom stream | 65 wt % | 40 wt % |
| % of ethylene in bottom stream | 0 wt % | 0 wt % |
| % of solvent + comonomer in bottom stream | 35 wt % | 60 wt % |

From the comparison it can be seen that the flash separation is more efficient than the liquid-liquid separation which can be seen in the higher polymer concentration in the bottom stream. The lower amount of liquid bottom stream of 32.5 wt % from the total amount of solution stream in E1 compared to 54 wt % allows the use of smaller downstream separators for the further concentration and separation of the polymer.

The invention claimed is:

1. A process for producing a polymer comprising the following steps of:
(A) polymerising, in a first polymerisation reactor in a first solvent,
a first olefin monomer having two or more carbon atoms and
optionally a first alpha-olefin comonomer containing from 3 to 10 carbon atoms,
in the presence of a first polymerisation catalyst and optionally a chain transfer agent and for producing a first solution comprising a first polymer of the first olefin monomer and the optional first alpha-olefin comonomer and the first solvent;
(B) polymerising, in a second polymerisation reactor in a second solvent,
a second olefin monomer having two or more carbon atoms and
optionally a second alpha-olefin comonomer containing from 3 to 10 carbon atoms,
in the presence of a second polymerisation catalyst and optionally a chain transfer agent and producing a second solution comprising a second polymer of the second olefin monomer and the optional second alpha-olefin comonomer and the second solvent;
(C) withdrawing a first stream of the first solution from the first polymerisation reactor;
(D) withdrawing a second stream of the second solution from the second polymerisation reactor;
(E) combining the second stream of the second solution with the first stream of the first solution to produce a combined stream of the first and second solution;
(F) passing the combined stream of the first and second solution to a first heating step and a second heating step;
(G) passing the combined stream of the first and second solution into a separation step, which separation step is conducted at a pressure of no more than 15 bar and in which separation step a liquid phase comprising the polymer and a vapour phase coexist;
(H) withdrawing a vapour stream and a concentrated solution stream comprising the polymer from the separation step;
(I) passing at least a part of the vapour stream to the first polymerisation reactor, to the second polymerisation reactor or to both.

2. The process according to claim 1 comprising an additional step of passing the first combined solution stream through a static mixer downstream of the second heating step.

3. The process according to claim 1 comprising steps of passing the vapour stream to a condensing step and withdrawing a partially condensed vapour stream from the condensing step.

4. The process according to claim 3 comprising steps of: passing at least a part of the vapour stream to the first heating step for heating the combined stream; and recovering the at least part of the vapour stream from the first heating step as the partially condensed vapour stream.

5. The process according to claim 4 comprising steps of: dividing the vapour stream into a first vapour stream and a second vapour stream; passing the first vapour stream to the first heating step for heating the combined solution stream and recovering the first vapour stream from the first heating step.

6. The process according to claim 5 comprising a step of dividing the partially condensed vapour stream into a condensed vapour stream and an uncondensed vapour stream.

7. The process according to claim 6 comprising a step of passing the condensed vapour stream to the first polymerisation reactor, to the second polymerisation reactor or to both the first polymerisation reactor and the second polymerisation reactor.

8. The process according to claim 7 comprising a step of passing at least a part of the uncondensed vapour stream to the first polymerisation reactor or to the second polymerisation reactor.

9. Process according to claim 1 wherein the first solvent and the second solvent are the same.

10. Process according to claim 1 wherein the first olefin monomer and the second olefin monomer are ethylene or propylene.

11. The process according to claim 1 wherein the second alpha-olefin comonomer is the same as the first alpha-olefin comonomer.

12. The process according to claim 1 wherein the first co-monomer has a boiling point that is less than the boiling point of the first solvent and the second co-monomer has a boiling point which is greater than the boiling point of the second solvent.

13. The process according to claim 1 wherein the polymer content in the concentrated solution stream withdrawn from the separation step is from 40 to 90% by weight, based on the total weight content of the solution stream.

14. A process for producing a polymer comprising the following steps of:
(A') polymerising, in a first polymerisation reactor in a first solvent,
a first olefin monomer having two or more carbon atoms and optionally a first alpha-olefin comonomer containing from 3 to 10 carbon atoms,
in the presence of a first polymerisation catalyst and optionally a chain transfer agent and producing a first solution comprising a first polymer of the first olefin monomer and the optional first alpha-olefin comonomer and the first solvent;
(B') polymerising, in a second polymerisation reactor in a second solvent,
a second olefin monomer having two or more carbon atoms and
optionally a second alpha-olefin comonomer containing from 3 to 10 carbon atoms
in the presence of a second polymerisation catalyst and optionally a chain transfer agent and producing a second solution comprising a second copolymer polymer of the second olefin monomer and the optional second alpha-olefin comonomer and the second solvent;
(C') withdrawing a first stream of the first solution from the first polymerisation reactor and passing the first stream to a first heating step and a second heating step;
(D') withdrawing a second stream of the second solution from the second polymerisation reactor and passing the second stream to a third heating step and a fourth heating step;
(E') combining a heated second stream of the second solution with a heated first stream of the first solution to produce a combined stream of the first and second solution;
(F') passing the combined stream of the first and second solution into a separation step, which separation step is conducted at a pressure of no more than 15 bar and in which separation step a liquid phase comprising the polymer and a vapour phase coexist;
(G') withdrawing a vapour stream and a concentrated solution stream comprising the polymer from the separation step;
(H') passing at least a part of the vapour stream to the first polymerisation reactor, to the second polymerisation reactor or to both.

15. The process according to claim 14 comprising an additional step of passing the first stream of the first solution through a static mixer downstream of the second heating step.

16. The process according to claim 14 comprising steps of passing the vapour stream to a condensing step and withdrawing a partially condensed vapour stream from the condensing step.

17. The process according to claim 16 comprising steps of: passing at least a part of the vapour stream to the first heating step for heating the first stream of the first solution; and recovering the at least part of the vapour stream from the first heating step as the partially condensed vapour stream.

18. The process according to claim 17 comprising steps of:
dividing the vapour stream into a first vapour stream and a second vapour stream;
passing the first vapour stream to the first heating step for heating the first stream of the first solution and recovering the first vapour stream from the first heating step;
passing the second vapour stream to the third heating step for heating the second stream of the second solution and recovering the second vapour stream from the third heating step; and
combining the first and the second vapour streams downstream the first and the third heating steps.

19. The process according to claim 16 comprising a step of dividing the partially condensed vapour stream into a condensed vapour stream and an uncondensed vapour stream.

20. The process according to claim 19 comprising a step of passing the condensed vapour stream to the first polymerisation reactor, to the second polymerisation reactor or to both the first polymerisation reactor and the second polymerisation reactor.

21. The process according to claim 20 comprising a step of passing at least a part of the uncondensed vapour stream to the first polymerisation reactor or to the second polymerisation reactor.

22. Process according to claim 14 wherein the first solvent and the second solvent are the same.

23. Process according to claim 14 wherein the first olefin monomer and the second olefin monomer are ethylene or propylene.

24. The process according to claim 14 wherein the second alpha-olefin comonomer is the same as the first alpha-olefin comonomer.

25. The process according to claim 14 wherein the first co-monomer has a boiling point that is less than the boiling point of the first solvent and the second co-monomer has a boiling point which is greater than the boiling point of the second solvent.

26. The process according to claim 14 wherein the polymer content in the concentrated solution stream withdrawn from the separation step is from 40 to 90% by weight, based on the total weight content of the solution stream.

* * * * *